(12) United States Patent  (10) Patent No.: US 8,676,779 B2
Unruh et al.  (45) Date of Patent: *Mar. 18, 2014

(54) EFFICIENT STORAGE AND SEARCH OF WORD LISTS AND OTHER TEXT

(75) Inventors: Erland Unruh, Seattle, WA (US); David Jon Kay, Seattle, WA (US)

(73) Assignee: Tegic Communications, Inc., Seattle, WA (US)

(*) Notice: Subject to any disclaimer, the term of this patent is extended or adjusted under 35 U.S.C. 154(b) by 8 days.

This patent is subject to a terminal disclaimer.

(21) Appl. No.: 13/526,396

(22) Filed: Jun. 18, 2012

(65) Prior Publication Data

US 2012/0259888 A1  Oct. 11, 2012

Related U.S. Application Data

(60) Continuation of application No. 12/243,882, filed on Oct. 1, 2008, now Pat. No. 8,204,921, which is a division of application No. 11/379,354, filed on Apr. 19, 2006, now Pat. No. 7,580,925.

(51) Int. Cl.
*G06F 17/30* (2006.01)
(52) U.S. Cl.
USPC .......................... 707/707; 707/708; 707/758
(58) Field of Classification Search
USPC .......................................... 707/707, 708, 758
See application file for complete search history.

(56) References Cited

U.S. PATENT DOCUMENTS

| | | | |
|---|---|---|---|
| 4,299,578 A | 11/1981 | Wayman | |
| 4,882,703 A | 11/1989 | Nicolai | |
| 4,903,269 A | 2/1990 | Fedele | |
| 5,109,352 A | 4/1992 | O'Dell | |
| 5,369,577 A | 11/1994 | Kadashevich et al. | |
| 5,701,459 A * | 12/1997 | Millett et al. | 1/1 |
| 5,952,942 A | 9/1999 | Balakrishnan et al. | |
| 6,009,444 A | 12/1999 | Chen | |
| 6,023,670 A * | 2/2000 | Martino et al. | 704/8 |
| 6,054,941 A | 4/2000 | Chen | |
| 6,104,317 A | 8/2000 | Panagrossi | |
| 6,119,120 A | 9/2000 | Miller | |
| 6,169,538 B1 | 1/2001 | Nowlan et al. | |
| 6,172,625 B1 | 1/2001 | Jin et al. | |
| 6,204,848 B1 | 3/2001 | Nowlan et al. | |
| 6,362,752 B1 | 3/2002 | Guo et al. | |
| 6,424,743 B1 | 7/2002 | Ebrahimi | |
| 6,502,118 B1 | 12/2002 | Chatterjee | |
| 6,686,852 B1 | 2/2004 | Guo | |
| 6,711,290 B2 | 3/2004 | Sparr et al. | |

(Continued)

FOREIGN PATENT DOCUMENTS

| | | |
|---|---|---|
| WO | WO-2004/111812 A2 | 12/2004 |
| WO | WO-2004/111871 A1 | 12/2004 |
| WO | WO-2006/026908 A1 | 3/2006 |

*Primary Examiner* — Debbie Le
(74) *Attorney, Agent, or Firm* — Michael A. Glenn; Perkins Coie LLP

(57) ABSTRACT

A computer readable storage medium tangibly embodying machine-readable digital data arranged to facilitate expedited searching. The data includes a plurality of words residing in a table having rows and columns, each word residing in a different row and each letter of the word occupying a different column in that row. Each continuous run of same letters in a column forms an interval. The words are positioned relative to each other to maximize lengths of the intervals, and/or optimize efficiency of compression of the columns by run length encoding.

8 Claims, 6 Drawing Sheets

(56) References Cited

U.S. PATENT DOCUMENTS

| | | |
|---|---|---|
| 6,757,544 B2 | 6/2004 | Rangarajan et al. |
| 6,801,659 B1 | 10/2004 | O'Dell |
| 6,807,529 B2 | 10/2004 | Johnson et al. |
| 6,864,809 B2 | 3/2005 | O'Dell et al. |
| 6,912,581 B2 | 6/2005 | Johnson et al. |
| 6,947,771 B2 | 9/2005 | Guo et al. |
| 6,955,602 B2 | 10/2005 | Williams |
| 6,956,968 B1 | 10/2005 | O'Dell et al. |
| 6,973,332 B2 | 12/2005 | Mirkin et al. |
| 6,982,658 B2 | 1/2006 | Guo |
| 7,020,849 B1 | 3/2006 | Chen |
| 7,057,607 B2 | 6/2006 | Mayoraz et al. |
| 7,075,520 B2 | 7/2006 | Williams |
| 7,095,403 B2 | 8/2006 | Lyustin et al. |
| 7,139,430 B2 | 11/2006 | Sparr et al. |
| 7,256,769 B2 | 8/2007 | Pun et al. |
| 7,257,528 B1 | 8/2007 | Ritchie et al. |
| 7,272,564 B2 | 9/2007 | Phillips et al. |
| 7,313,277 B2 | 12/2007 | Morwing et al. |
| 7,349,576 B2 | 3/2008 | Holtsberg |
| 7,389,235 B2 | 6/2008 | Dvorak |
| 7,437,001 B2 | 10/2008 | Morwing et al. |
| 7,466,859 B2 | 12/2008 | Chang et al. |
| 7,580,925 B2 | 8/2009 | Unruh et al. |
| 7,603,705 B2 | 10/2009 | Roy et al. |
| 7,774,746 B2 | 8/2010 | Mansfield et al. |
| 7,972,205 B2 * | 7/2011 | Krishna ............................ 463/9 |
| 8,117,540 B2 * | 2/2012 | Assadollahi ................... 715/256 |
| 8,135,729 B2 * | 3/2012 | Brewer et al. .................. 707/767 |
| 2002/0135499 A1 | 9/2002 | Guo |
| 2003/0023426 A1 | 1/2003 | Pun et al. |
| 2003/0054830 A1 | 3/2003 | Williams et al. |
| 2003/0144830 A1 | 7/2003 | Williams |
| 2003/0179930 A1 | 9/2003 | O'Dell et al. |
| 2004/0153963 A1 | 8/2004 | Simpson et al. |
| 2004/0153975 A1 | 8/2004 | Williams et al. |
| 2004/0163032 A1 | 8/2004 | Guo et al. |
| 2005/0114770 A1 | 5/2005 | Sacher et al. |
| 2006/0129928 A1 | 6/2006 | Qiu |
| 2006/0136408 A1 | 6/2006 | Weir et al. |
| 2006/0155536 A1 | 7/2006 | Williams et al. |
| 2006/0158436 A1 | 7/2006 | LaPointe et al. |
| 2006/0173807 A1 | 8/2006 | Weir et al. |
| 2006/0193519 A1 | 8/2006 | Sternby |
| 2006/0236239 A1 | 10/2006 | Simpson et al. |
| 2006/0239560 A1 | 10/2006 | Sternby |
| 2007/0094718 A1 | 4/2007 | Simpson |
| 2007/0203879 A1 | 8/2007 | Templeton-Steadman et al. |
| 2007/0276814 A1 | 11/2007 | Williams |
| 2007/0285397 A1 | 12/2007 | LaPointe et al. |
| 2008/0130996 A1 | 6/2008 | Sternby |

* cited by examiner

802 — 2c 2W 1S 6t 4c 1g 1b  <end>  — 812
803 — 13h 4l  <end>
804 — 4i 8e 3u 1i 1e  <end>
805 — 2m 2t 2r 27 2a 1o 1r 1t 1a  <end>
806 — 3n 3m 2' 2t 2r 5c  <end>
807 — 3e 3a 1l 1v 2r 2i 5h  <end>
808 — 3y 2n 2l 7e 3  <end>
809 — 1 1s 7 5s 3  <end>

EFFICIENT STORAGE AND SEARCH OF WORD LISTS AND OTHER TEXT

CROSS REFERENCE TO RELATED APPLICATIONS

This application is a continuation of U.S. Ser. No. 12/243,882, filed Oct. 1, 2008 now U.S. Pat. No. 8,204,921, which is a divisional of U.S. Ser. No. 11/379,354, now U.S. Pat. No. 7,580,925, filed Apr. 19, 2006, each of which is incorporated herein in its entirety by this reference thereto.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to a text storage and search system. More particularly, the invention concerns the storage of text in a virtual table, employing a novel arrangement to facilitate expedited searching. Other aspects of the invention include related methods, apparatuses, logic circuitry, computer program products, and the like.

2. Description of the Related Art

In today's digital age, digitally stored data is ubiquitous. Digital data is stored in volatile and nonvolatile devices such as hard drives, memory sticks, floppy diskettes, integrated circuits, magnetic tape, optical discs, and many more.

With the widespread popularity of handheld devices, it is also become increasingly important to store data in a compact format. Due to continuing arrival of technical advances, the physical devices themselves shrink in size from year to year. And, aside from the design of the physical device, there has been a steady stream of software algorithms providing various types of data compression. Even in applications where size is not crucial, data compression still provides a benefit because the same size storage device can accommodate more data.

Hand-in-hand with storage size, consumers demand maximum storage speed. Consequently, data storage devices have seen regular advances in their speed of operation. And, aside from the design of the physical device, there have been numerous software algorithms that seek to more efficiently locate stored data, and to store the data in a way that is conductive to quicker searches and retrieval.

Still, consumers' hunger is insatiable, demanding faster and more compact digital data storage than the last. Despite significant advances in the past, and widespread commercial success of certain products, there is a continual search to improve the size and speed of digital data storage. In this respect, it seems that new problems always present themselves, and known digital data storage technology is never completely adequate for all consumers' needs.

SUMMARY OF THE INVENTION

One aspect of this disclosure includes computer readable storage medium tangibly embodying machine-readable digital data arranged to facilitate expedited searching. The data includes a plurality of words residing in a table having rows and columns, each word residing in a different row and each letter of the word occupying a different column in that row. Each continuous run of same letters in a column forms an interval. The words are positioned relative to each other to maximize lengths of the intervals, and/or optimize efficiency of compression of the columns by run length encoding.

The teachings of this disclosure may be implemented as a method, apparatus, logic circuit, signal bearing medium, or a combination of these. This disclosure provides a number of other advantages and benefits, which should be apparent from the following description.

BRIEF DESCRIPTION OF THE DRAWINGS

FIG. 8 is an example of a compressed word storage table.

DETAILED DESCRIPTION

Figure 1:
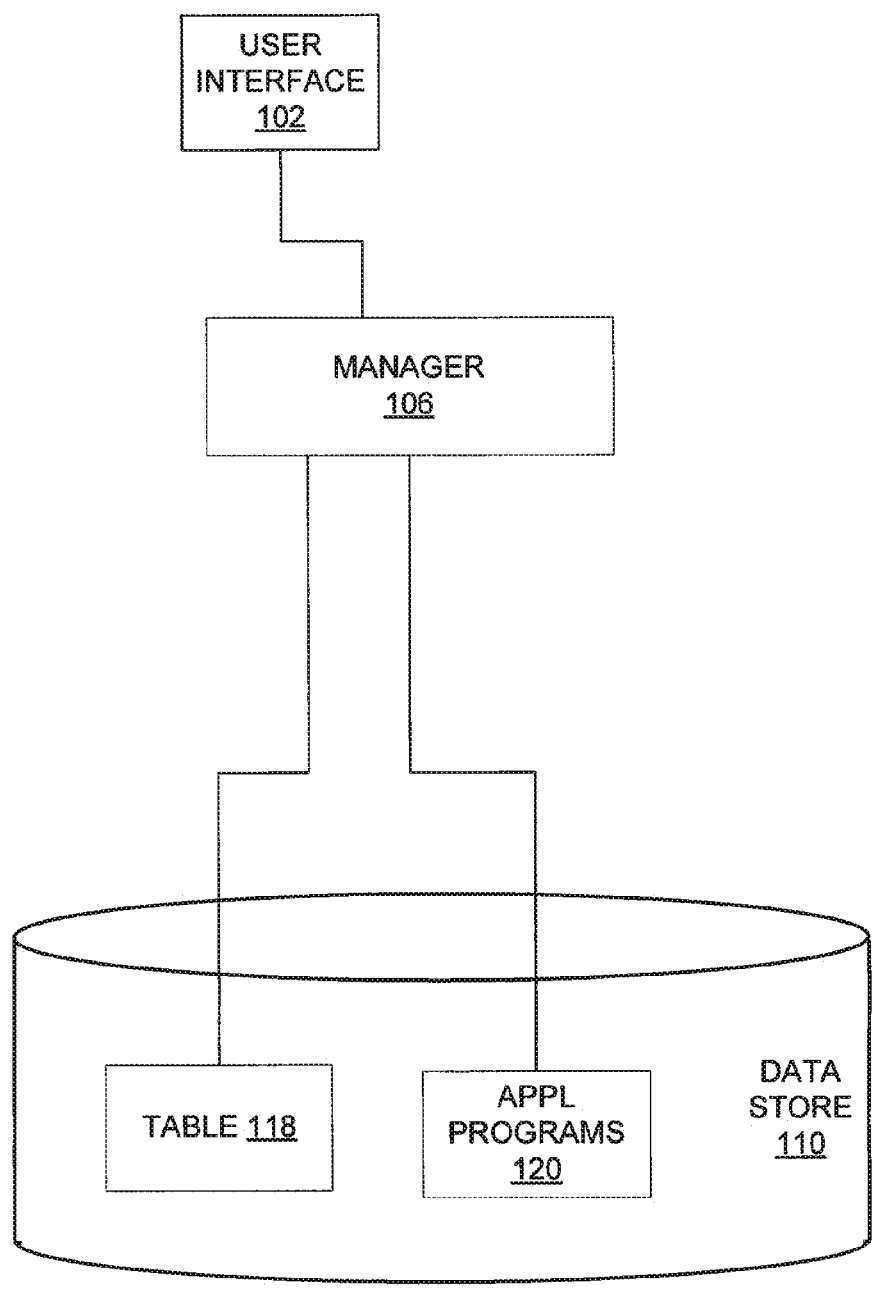
FIG. 1 is a block diagram of the components and interconnections of a text storage and search system.

The nature, objectives, and advantages of the invention will become more apparent to those skilled in the art after considering the following detailed description in connection with the accompanying drawings.

Hardware Components & Interconnections

Overall Structure

One aspect of the present disclosure concerns a text storage and search system. One example is the system 100 of FIG. 1. The system 100 includes a user interface 102, manager 106, and data storage 110. The user interface 102 comprises equipment to translate biometric input from a human into machine-readable signals, and vice versa. As to user input, the interface 102 may include a full or reduced-key keyboard, soft keyboard, digitizing surface, pointing device, speech recognition system, eye gaze tracking system, etc. As to machine output to the user, some examples of the interface 102 include a LCD video display, speaker, LED matrix, plasma display, CRT, etc. Beyond this, the interface 102 may be implemented using any technology appropriate to the functions described herein.

The manager 106 performs various tasks according to user data and commands received via the interface 102. Specific tasks of the manager 106 are described in greater detail below. The manager 106 may be implemented by one or more hardware devices, software modules, a combination, etc. Some specific examples are discussed below in conjunction with FIGS. 2-4.

The data store 110 stores data under direction of the manager 106. The data store 110 may be implemented by hardware devices such as those described below in conjunction with FIGS. 3-4. The store 110 contains a table 118, which contains machine-readable digital data arranged to facilitate expedited searching, as described in greater detail below. As discussed below, the table 118 stores words in various rows and columns. Each word occupies a different row. Each letter of the word occupies a different column in that row. Of course, the nature of machine-readable digital data storage is such that there is never any physical "table." As discussed in further detail below, data is stored in addresses and arranged in various logical constructs that map to a table, as discussed in greater detail below. To emphasize this, this table 118 may also be referred to as a virtual table, virtual matrix, logical table, logical matrix, etc.

The application programs 120 include software or firmware programs executed by the manager 106. Some examples include word processing, contacts directory, email, instant messaging, disambiguation of user entered text, calendar management, or any other program desired by the user. As a specific example, the application programs 120 may include T9® brand word disambiguation technology. T9 technology is described in a variety of patents, such as U.S. Pat. Nos. 5,818,437, 5,953,541, and 6,011,554. The foregoing documents are incorporated herein by reference in their entirety. Alternatively, any of the application programs 120 may be implemented in circuitry or other forms, such as those examples discussed below in the context of FIGS. 2-4.

Exemplary Digital Data Processing Apparatus

As mentioned above, data processing entities (such as the manager 106) may be implemented in various forms. Some examples include a general purpose processor, digital signal processor (DSP), application specific integrated circuit (ASIC), field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Figure 2:
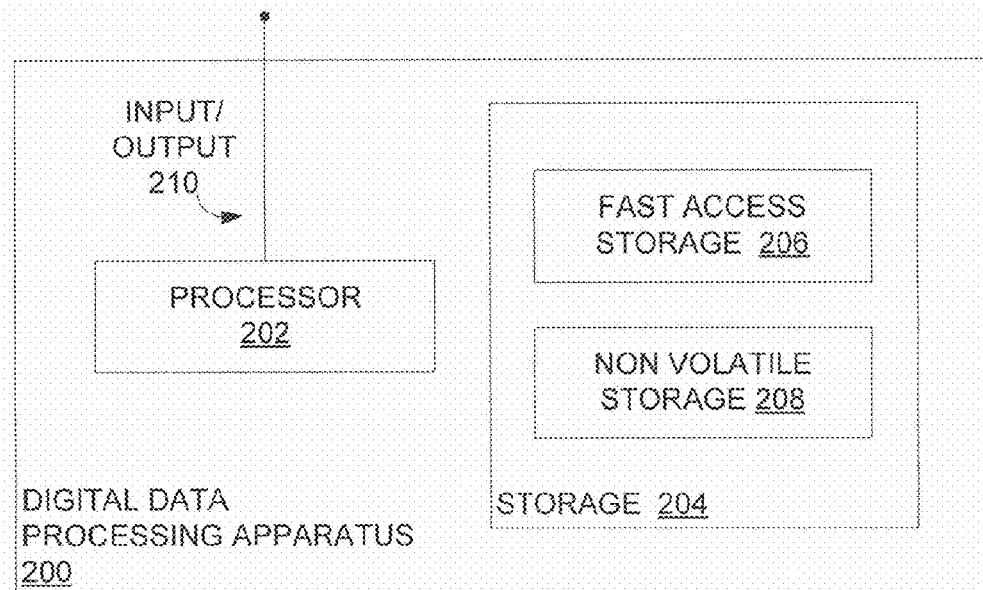
FIG. 2 is a block diagram of a digital data processing machine.
Figure 3:
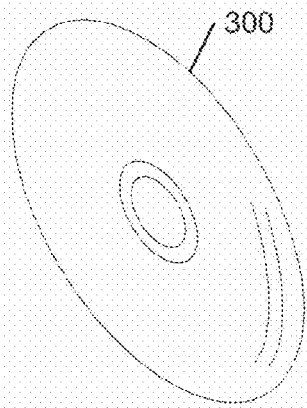
FIG. 3 shows an exemplary signal-bearing medium.

As a more specific example, FIG. 2 shows a digital data processing apparatus 200. The apparatus 200 includes a processor 202, such as a microprocessor, personal computer, workstation, controller, microcontroller, state machine, or other processing machine, coupled to storage 204. In the present example, the storage 204 includes a fast-access storage 206, as well as nonvolatile storage 208. The fast-access storage 206 may be used, for example, to store the programming instructions executed by the processor 202. The storage 206 and 208 may be implemented by various devices, such as those discussed in greater detail in conjunctions with FIGS. 3 and 4. Many alternatives are possible. For instance, one of the components 206, 208 may be eliminated; furthermore, the storage 204, 206, and/or 208 may be provided on-board the processor 202, or even provided externally to the apparatus 200.

The apparatus 200 also includes an input/output 210, such as a connector, line, bus, cable, buffer, electromagnetic link, network, modem, or other means for the processor 202 to exchange data with other hardware external to the apparatus 200.

Signal-Bearing Media

As mentioned above, various instances of digital data storage may be used, for example, to provide storage 100 (FIG. 1), to embody the storage 204 and 208 (FIG. 2), etc. Depending upon its application, this digital data storage may be used for various functions, such as storing data, or to store machine-readable instructions. These instructions may themselves aid in carrying out various processing functions, or they may serve to install a software program upon a computer, where such software program is then executable to perform other functions related to this disclosure.

In any case, the signal-bearing media may be implemented by nearly any mechanism to digitally storage machine-readable signals. One example is optical storage such as CD-ROM, WORM, DVD, digital optical tape, disk storage 300 (FIG. 3), or other optical storage. Another example is direct access storage, such as a conventional "hard drive", redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor can read information from, and write information to, the storage medium. In the alternative, the storage medium may be integral to the processor. In another example, the processor and the storage medium may reside in an ASIC or other integrated circuit.

Logic Circuitry

In contrast to signal-bearing media that contain machine-executable instructions (as described above), a different embodiment uses logic circuitry to implement processing features such as the manager 106.

Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Figure 4:
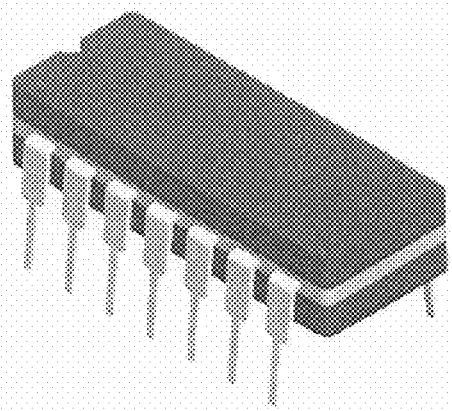
FIG. 4 is a perspective view of exemplary logic circuitry.

FIG. 4 shows an example of logic circuitry in the form of an integrated circuit 400.

Operation

Having described the structural features of the present disclosure, the operational aspect of the disclosure will now be described. The steps of any method, process, or algorithm described in connection with the embodiments disclosed herein may be embodied directly in hardware, in a software module executed by a hardware, or a combination of the two.

Storing Words

Figure 5:
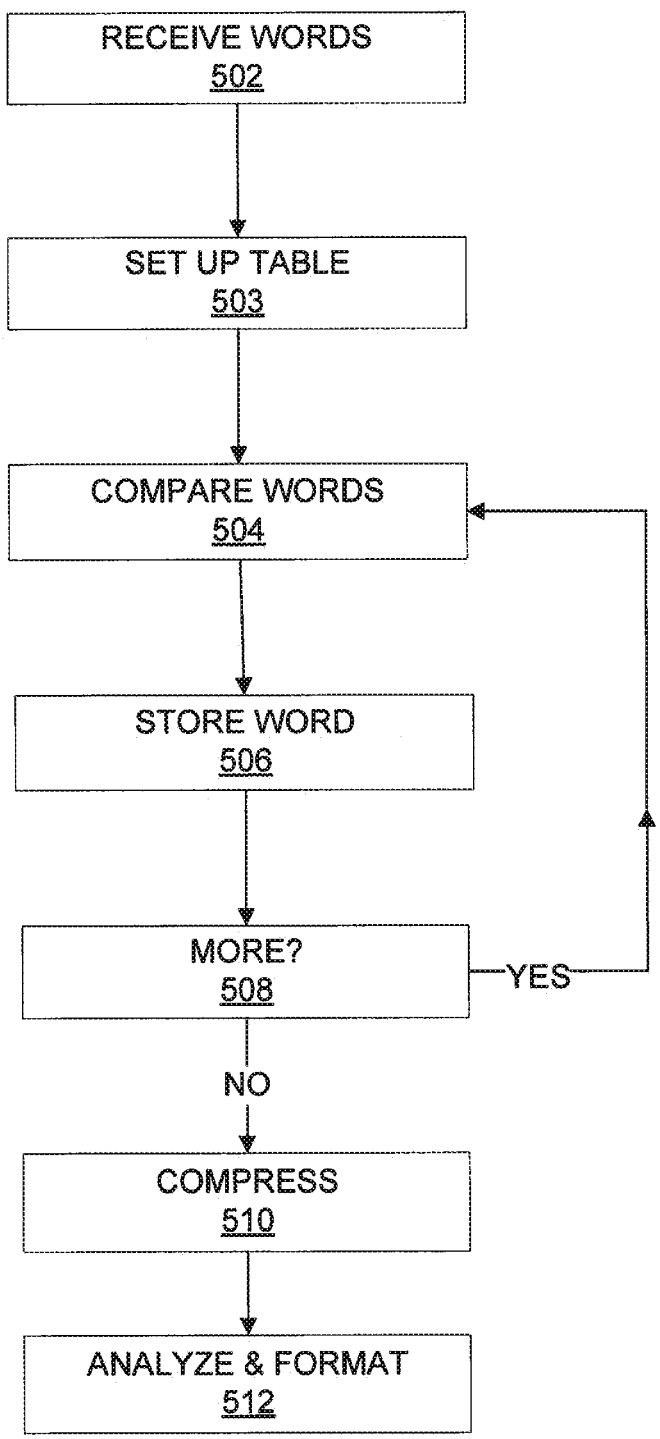
FIG. 5 is a flowchart of a sequence to store words to facilitate expedited searching.

FIG. 5 illustrates one example of the method aspect of this disclosure. Broadly, the sequence 500 demonstrates a novel process that stores a word list configured to facilitate expedited searching. For ease of explanation, but without any intended limitation, the sequence 500 is discussed in the specific context of the system 100 of FIG. 1.

The sequence 500 may be performed when the system 100 is initiated, stalled, manufactured, booted-up, activated, or other appropriate occasion. In step 502, the manager 106 receives a group of words to be input into the table 118. This collection of words is referred to as an initial dictionary or a "source list." The initial dictionary arrives at the manager 106 by manual input by a technician, installation with the system 100, downloading from a remote site, retrieval from an archived or setup facility in the data store 110, etc.

In step 503, the manager 106 sets up the table 118. The table contains a number of rows and columns. When finished, table 118 will store each word in a different row and each letter of the word occupying a different column in that row. Of course, the nature of machine-readable digital data storage is such that there really is not any physical table. Rather, data is stored in addresses and arranged in various logical constructs that map to a table. Although devoid of any words in step 503, the table is referred to as a "target list" or "target word list."

The following example defines a one-word-per-row example. Here, step 503 defines the table to include at least as many rows as the number of words in the source list, and at least as many columns as the number of letters in the longest word. In a more particular example (not shown), the table may include as many columns as the number of letters in the longest word plus one, in order to specify a "null" character after the longest word. This may be used in searching the table, as discussed in greater detail below.

After step 503, the manager 106 inputs words from the source list one by one into the initially empty table 118. Namely, in step 504 the manger 106 compares each word in the source list to the bottom (last) word in the target list (table 118). In step 506, the manager 106 stores the most similar word from the source list (as found by the comparison 504) at the bottom of the target list, and optionally removes this word from the source list. Steps 504 and 506 continue to repeat all words in the source list have been processed (506), or if words are removed from the source list one-by-one, until step 508 finds that no more words remain in the source list.

In a particular example, step 504 works as follows. When comparing two words, step 504 does a letter-by-letter comparison, awarding one point for each letter that matches. For example, the comparison of "ptarmigan" and "search" would yield two points. The comparison of "caribou" and "cartoon" would yield four points. The comparison of "ptarmigan" and "ptarmigans" would yield nine points. After comparing each word in the source list to the word at the bottom of the target list in step 504, step 506 stores the most similar source list word at the bottom of the table. If there is a tie between two words in the source list (both having the same number of points in comparison to the last word in the target list), then task 506 uses the first word occurring in the source list. If step 506 finds the current word already in the table 118, then the current word is discarded.

Steps 504 and 506, then, have the effect of sorting the source list words in order of similarity. Similarity, in this sense, is loosely defined as the number of common symbol positions in the words. After step 506, step 508 asks whether there are any remaining words from the source list to process and add to the table 118. If yes, then the next word becomes the current word, and steps 504, 506 repeat as discussed above.

The foregoing is merely one example. Tasks 504-506 may employ any of a huge variety of different comparison schemes, beyond picking words one-by-one on a best match basis. Many of these will be apparent to those of ordinarily skill in the art, having the benefit of this disclosure. Furthermore, the comparison scheme may include other features specifically designed to order words in the target list in a way that is most conducive to compression by step 510 (described below).

Optionally, when step 508 finds that that all words from the initial dictionary have been processed, step 510 compresses the table 118. In one example, compression uses run length encoding to separately compress each column of the table. A detailed example is discussed below.

In step 512, the manager 106 analyzes the completed (and optionally compressed) table 118, and formats the table. Step 512 may, for instance, add header information and/or other metadata. In a specific example, step 512 counts the number of intervals in each column of the completed table and stores the count in table metadata. Furthermore, step 512 may rank the columns according to how many intervals they contain, and place this information in table metadata. Additionally, step 512 may analyze the completed table 118 to identify the last table row where words of certain lengths are located. For instance, step 512 may prepare a listing of which row contains the last one-letter word, the last two-letter word, and so on. This information is stored in the table metadata.

Modifications

The sequence 500 may be modified in various ways, some of which are discussed as follows. In the present example, the table 118 once constructed is static. That is, new words are not added to the table 118. This helps conserve processing effort, because repeating the operations 500 when a new word is added can be time consuming. In this example, the operations 500 represent a one-time act of compiling the table 118. In a different example, the table 118 permits the addition of new words on occasion. For example, the new word may be compared to the existing words in the table, and placed nearest the word of most similarity.

In a completely different example, the sequence 500 may be modified to incorporate a limited subset of frequently used words. In this example, prior to conducting steps 504, 506 for the first time, an ordered list of most-frequently used words are moved from the source list to the target list. Then, operations 504-510 are conducted normally. Since new words from the source list are compared and added at the table's end, this preserves the content and order of the frequently used words at the top of the table. These words may be the most frequently occurring words in general usage, user-entered words, words most frequently used by a given user, etc. In one example, these most-frequently used words may comprise about five percent of the words in the table 118. Alternatively, the manager 106 may use a physical or logical location apart from the table 118 to separately maintain a list of frequently entered words, user-entered words, etc.

Completed Table 118

Figure 7:
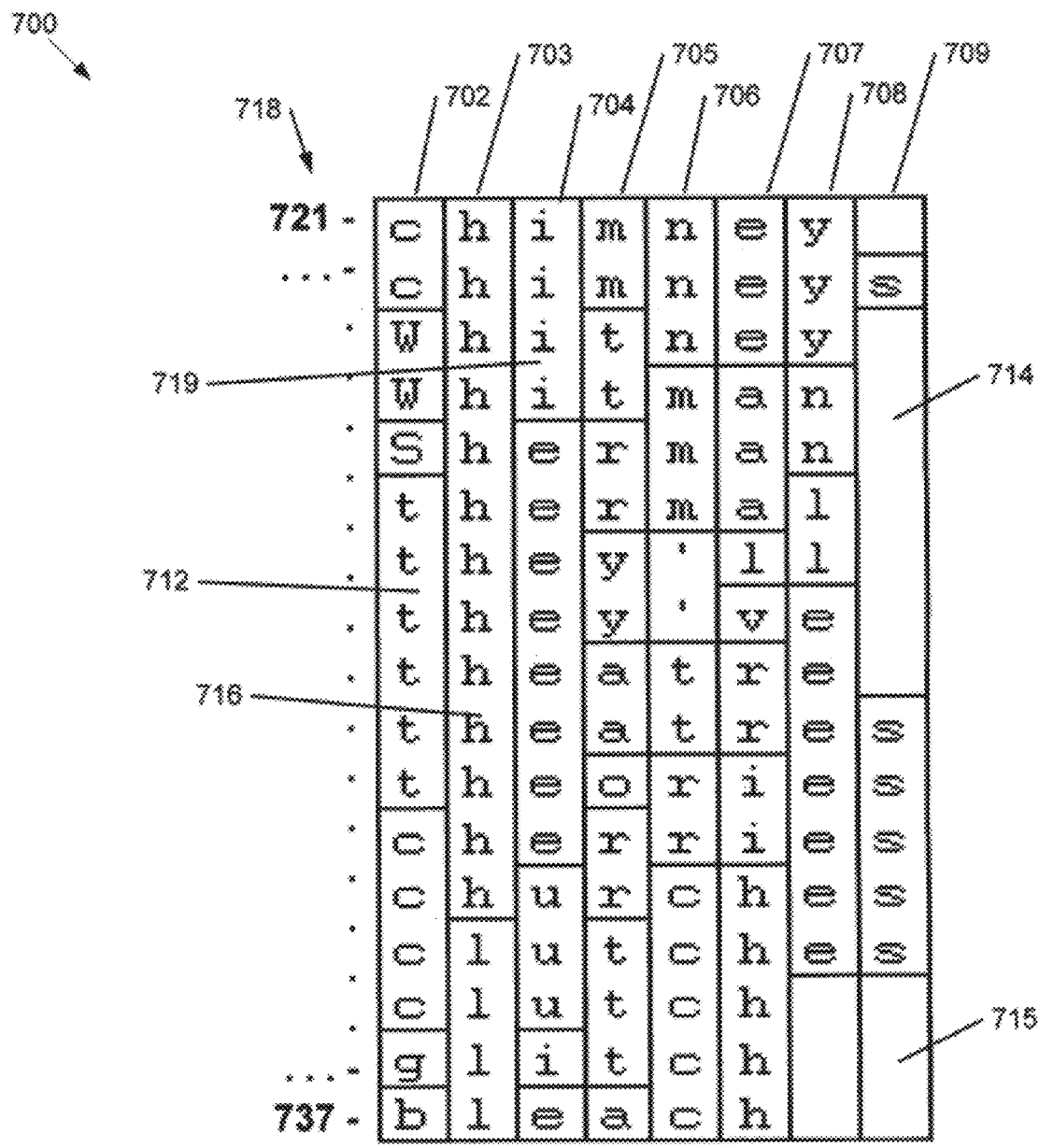
FIG. 7 is an example of a word storage table.

FIG. 7 shows an example 700 of a completed table 118. The table 700's rows are show by horizontal lines of characters, and the columns are shown by 702-709. In this example, the table 700 accommodates words as long as nine letters.

Although "letters" can certainly refer to letters of the alphabet, this disclosure should not be unduly limited to such an example. Letters may further include punctuation marks, numbers, and other symbols that go together to form recognized groupings of characters such as words.

Thus, each word in the table 118 occupies a different row. Each letter of each word occupies a different column in that row. The first letter of each word occurs in the column 702. A run of same letters in a column forms an "interval." One example of an interval is 712, where six occurrences of the letter "t" occur together. Another interval is 716, where thirteen occurrences of the letter "h" occur together. Another interval is 719, where there is a run of four occurrences of "i." The table 700 also contains blank or "null" intervals, such as 714 and 715.

Optionally, each row is assigned a row number or address. The row addresses (721-737) are indicated by 718. The assignment of row addresses helps speed the searching of the table 700, as discussed in greater detail below.

The natural result of the organizational steps 504, 506 is that the words in the table 700 are arranged to maximize lengths of the intervals. As discussed below, having longer intervals speeds the process of searching the table 700.

Compressed Table

As referenced above (step 510), the table 118 may be compressed. In this example, compression uses run length encoding to separately encode each column of the table. Moreover, the original table 700 may be discarded and future searches conducted entirely using the compressed table 800. This is discussed in greater detail below.

FIG. 8 shows an example of a compressed table 800. Here, the table 800 represents the results of compression of the table 700 by step 510. More particularly, the table 800 represents a series of data streams 802-809, each corresponding to one of the columns 702-709. In the data stream 802, for example, the coding "2c 2W 1S 6t 4c 1g 1b" means two occurrences of "c", two occurrences of "W", one occurrence of "S", six occurrence of "t", four occurrence of "c", one occurrence of "g", and one occurrence of "b." Any data streams with a number not followed by a letter (such as "3" in data stream 808), indicates that number of occurrences of "null".

The addresses 718 may also be incorporated into the table 802-809, although not shown. Although the data streams 802-809 are shown in separate rows, this is merely for illustration. By incorporating end markers such as 812, the data streams 802-809 may be stored in one continuous stream.

Expanding upon the simplified example 800, APPENDIX A shows a more detailed listing of data streams representing a compressed expression of the table 700. In this example, the compression scheme involves calculating the total number of times each pair of symbol/length appears and then picking the 255 top pairs for a one byte encoding. At this point, this yields about a 95% interval coverage. Everything else is encoded using the last one byte value as an "escape" followed by a more direct information encoding (resulting in 3 bytes for intervals). A number of the escape intervals are encoded as two one byte intervals when possible to save space. Jump information (described below) is also encoded as escape data in the interval stream.

The following continues with explanation of a specific, exemplary implementation of the compressed table 800. To facilitate optimization (making the database scheme more alphabets independent) symbols found in the database word list are encoded as single byte codes. Interval streams are built up from a small set of entities. The stream is a sequence of such entities. The one byte interval is by far the most common entity and thus the rest are encoded using an escape value plus content. The 255 most common combinations/pairs of symbol and length are encoded as one byte codes. The database header includes tables to decode these values into symbols and lengths. When a direct interval can be replaced by two one-byte codes it will be done to save the space of the escape code. The low frequency intervals are directly encoded in 3 bytes using escape, symbol code and length. Maximum interval length is thus 255. To encode a longer interval an extension is added.

After reading a direct interval the stream must be checked to see if it's followed and modified by an extension. In the example below FF is the escape info, 10 is the symbol code and 6 is the interval length. FF-10-06 means INTERVAL code 16, char t, length 6.

A direct interval can be followed by an extension encoded as another 3 bytes using escape, extension code and length. This length becomes the higher byte of the preceding interval. With this extension the maximum interval length becomes 65535. In the example below FF is the escape info, 0C is the symbol code for "extension" and 33 is the high byte length value that gets added to the length in the preceding interval.

FF-10-06 INTERVAL code 16, chart, length 6
FF-0C-33 EXTEND high byte length 33, actual length 13062.

Jump information is encoded in 6 bytes using escape, jump code, 2 byte relative word position and 2 byte relative stream position. The relative values become absolute by adding the current absolute values from where the jump information is found. In the example below FF is the escape info, 0B is the symbol code for "jump", 00 is the high byte for positions, 05 is the low byte for positions, 00 is the high byte for bytes and 09 is the low byte for bytes.

FF-0B-00-05-00-09 JUMP 5 relative positions, 9 relative bytes.

End information is encoded in 2 bytes using escape and end code. In the following example FF is the escape info and 0D is the symbol code for "end".

FF-0D END

Jump Codes

Information in the data streams are "relative" intervals of different lengths since the information found in each interval is character plus length, not an absolute position. Therefore, in one example, starting from a given interval, it would impossible to know where to look in the data stream for a word position (i.e., table row), or to find a certain interval. Thus, the only way to skip forward would be to read and interpret every interval in the stream until you find the interval that contains the target address.

Consequently, to speed this process up, the compressed table 800 may further include a number of "jump codes." As discussed below, this helps speed the searching of the table 800. Jump codes help indicate the relationship between word positions (=table rows) as represented by the data streams, and their actual locations (=addresses) in the data stream. For instance, a jump code might indicate how many bytes in a data stream must be skipped in order to advance a given number of word positions. As a specific example, a jump code occurring right away in the data stream 802 may indicate that to skip ahead four word positions (i.e., four letters progressing downward in a table column), advancement of a given number of bytes is needed. This would be helpful, for example, in moving a pointer from before the first "c" in column 702 past the last "W" in that column, in order to set the pointer to the first "S."

Jump information may include, for example, information such as: to go five hundred word positions forward in the list, go to this specific location (address) in the data stream. In one example, jump codes are located at certain known positions in the stream and actually point to each other, creating a ladder of jump information. Since jump information occurs in the data stream before it can be used, it is useful any time until the next jump code is encountered. Thus, known information can be put into use at any time when moving forward. As soon as the target word position is at or beyond that known position there is no need to go through intervals any more.

In a specific implementation, jump codes may be placed at about every one hundred intervals. Jump codes can cover different spans of word positions depending on how long the intervals actually are. This aids in skipping intervals, rather than jumping a certain distance in the absolute list.

Search

Figure 6:
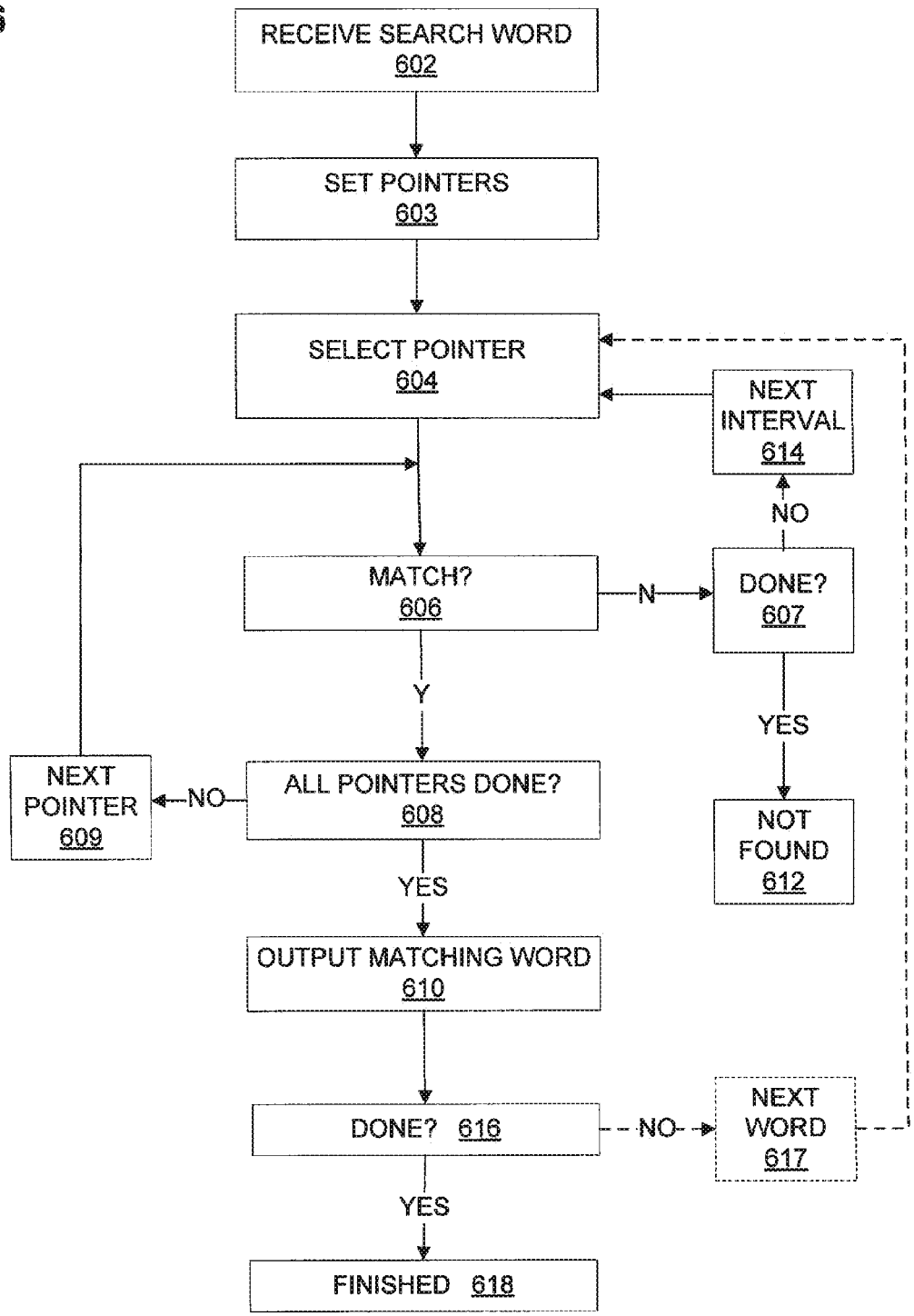
FIG. 6 is a flowchart of a sequence to conduct an expedited search of words stored according to FIG. 5.

FIG. 6 illustrates another example of the method aspect of this disclosure. Broadly, the sequence 600 demonstrates a novel process that conducts expedited searches through a table 118, whether uncompressed 700 or compressed 800. The search for words is accelerated because the process uses the run-length intervals to skip words that are known to not match. As soon as a run-length interval doesn't match, the entire length of that interval can be skipped.

For ease of explanation, but without any intended limitation, the sequence 600 is discussed in the specific context of the system 100 of FIG. 1, and tables 700 and 800 of FIGS. 7-8. In step 602, the manager 106 receives an input word, or "search word." The remaining operations search for occurrence of the search word in the table 118. These operations, as discussed below, may also be implemented to search for multiple occurrences of a part of a search word. The following example is given where "churches" is the search word.

Step 602 may occur for any number of reasons. In one example, one of the application programs 120 is a user input disambiguation program such as T9® technology, mentioned above. Continuing with this example, the search word is received (602) when the user enters an inherently ambiguous keypad combination, such as the keypad numbers "2-8." Since letters "A-B-C" are mapped to the number "2" and "T-U-V" are mapped to keypad number "8," this user entered key combination may represent any of the following combinations: AT, AU, AV, BT, BU, BV, CT, CU, or CV. In this example, the T9 application program 120 individually feeds these words to another application program 120 (namely, the process 600). When each such word is received, this constitutes step 602 in this example. The T9 application program consolidates and processes the matching words output by the program 600, and outputs them to the user as a list of possible candidates intended by the user.

Of course, there may be other situations where the process 600 is invoked, apart from the foregoing example. For example, the process 600 may be used as a spell checker.

After step 602, step 603 configures a number of virtual pointers (not shown), which basically comprise cursors, placeholders, or other tool for keeping track of advancement through each column of the table 700. In this example, there is one pointer for each of the columns 702-709. Each pointer keeps track of a current table row, for that column. Step 603 sets each pointer to point to the corresponding letter of the first row 721. In the example of table 700, the pointers individually point to the letters of "chimney."

After the setup of step 603, step 604 considers a "first" pointer, making this the "current" pointer under consideration. In a simple case, the first pointer is the leftmost pointer, and subsequent letters are compared by moving to the right one pointer at a time (609). In contrast to the simple case, step 604 may carefully choose the order of pointer progression to optimize the search speed. Here, step 603 must have previously consulted the table metadata, which is described above in conjunction with step 512. Particularly, step 603 considers the length of the search word (i.e., number of columns occupied), and consults the table metadata to find the number of intervals occurring in each column of the search word. Then, step 604 establishes the pointer progression as moving from the column with least-intervals to the column with most-intervals (as determined in step 603).

The following example uses the simple case, where pointer movement progresses from left to right. Step 606 then asks whether the letter at the first pointer (i.e., the first letter) matches the first letter of the search word "churches." In this case, the answer is yes, so step 606 progresses to step 608. Step 608 asks whether step 606 has iteratively found that the letters of all pointers match the search word.

In this present example, the answer to step 608 is "no" because step 606 has only looked at the first pointer's letter. Step 608 takes particular measures to guarantee that the search word exactly matches a word from the table. For instance, to preclude "chimney" from matching "chimneys". Namely, step 608 must keep going even after all pointers have shown a match to additionally verify that the next letter in the table's current row (past the letters matching the search word) is a blank, empty, or null.

In the present example, step 608 answers "no" and proceeds to step 609. Step 609 advances to the second pointer, making this the "current" pointer. As mentioned above, various other different progressions then left-to-right may be used. One example is where the pointer progression moves the column with least-intervals to the column with most-intervals.

As part of step 609, the now-current pointer must be moved to the current row of the table. As an alternative, at a higher processing cost, all pointers may be moved to the current row when the appropriate ones of steps 604, 614, and/or 617 are performed. To move the current pointer to the current row of the table in step 609, the pointer is advanced downward until it reaches the row of the pointer that was being used when step 606 last answered "yes." In one example, step 609 involves advancing the current pointer row by row, skipping intervals where possible.

In the example of the table 700 that has been compressed according to table 800 or APPENDIX A, jump codes may be used to speed the movement of the current pointer downward in the table. Basically, the current pointer indicates the current word position (=table row); the destination table row is known by the location of the pointer from the last performance of step 606. Rather than advancing row by row in the table 800, the current cursor can be advanced by relative jumps, where each jump code indicates a relative jump and a resulting address in the table 800. So, if the cursor must be advanced a total of two hundred twenty three rows, this operation can use a combination of two one hundred step jump codes followed by twenty three manual increments by intervals and/or individual rows.

After step 609 advances to the next pointer, step 606 asks whether that pointer's letter matches the corresponding letter of the search word. In the present example, the answer is "yes" because the second letter of the search word and the second letter of the current row are both "h". The process 600 continues as described above until all pointers' letters match the search word (leading to step 610) or a pointer's letter does not match the search word (leading to step 607).

In an alternative embodiment, the routine 600 may also be configured to find partial matches. In this case, the application program invoking the routine 600 provides a minimum number of matching characters, such as the first three characters. Then, the routine 600 executes as described above, except that pointer movement progresses (step 609) from left to right in the search word, and the criteria (step 608) for a match between search word and table word is satisfied when the prescribed character minima shows a match. As discussed below, the routine 600 in this embodiment continues until all matching words in the table are found (618) or no such words are found (612).

When step 606 finds that a pointer's letter does not match the search words, then step 607 is performed. In the present example, this condition occurs when the third pointer's letter ("i") is compared to the third letter of the search word ("u"). In step 607, the manager 106 asks whether all table rows have been evaluated by step 606. If so, this means the routine 600 has not found a match to the search word anywhere the table 700.

As an alternative, the table may include metadata identifying the last table row where words of certain lengths are located. As mentioned above, table metadata may include a listing of which row contains the last one-letter word, the last two-letter word, and so on. In this embodiment, step 607 may take a shortcut. Namely, rather than asking whether all rows have been evaluated by step 606, step 607 can answer "yes" early if remaining rows of the table 118 do not contain any words of the same number of letters as the search word.

In any case, when step 607 answers "yes," the manager 106 provides an output representing that the search word was not found (step 612). This output may be a text output, binary or other machine-readable signal, etc. The manager 106 provides this output to the application program 120 that initiated the search operation 600.

In contrast, when step 607 finds that all rows have not yet been processed, then the routine 600 proceeds to step 614. Namely, step 614 advances to the next interval occurring in the column of the pointer where the mismatch occurred. In the present example, step 614 recognizes that, since the third pointer's letter does not match the search word's third letter, it would be fruitless to perform any further comparisons between the search word and words in rows passing through the interval 719. All of these words contain "i" as the third letter, whereas the third letter of the search word "church" is "u."

To skip to the next interval, step 614 advances downward in the table by the number of remaining rows in the current interval. Namely, the current pointer (for the column where the mismatch occurred in step 606) is moved ahead until the next interval is encountered. In the present example, there are four rows in the interval 719 (indicated by the code "4$i$" in the data stream 804), so step 614 moves the current pointer ahead by four rows. After the skip-ahead (614), step 604 resets to the first pointer, making this the "current" pointer under consideration, and moving this pointer to the current row. As an alternative, step 604 may keep as the current pointer that pointer where the column mismatch occurred in step 606, and move this pointer to the current row. As still another option, step 604 may set the current pointer to the column with the least-intervals (as determined above) and move this pointer to the current row. After step 604, step 606 then asks whether the letter at the first pointer (in this example) matches the first letter of the search word "churches." In this case, the answer is no, since the pointer's first letter is now "S" of "Sherman," whereas the first letter of the search word "church" is "c." Therefore, step 606 advances to step 607 to proceed to the next interval.

In contrast to the scenario describe above, where all pointers' letters have not matched the search word ("no" in 608), a different situation is where a match does occur ("yes" in 608). This indicates that the search word has been found in the table 700. Accordingly, the manager 106 provides an output (step 610) representing this fact, such as a text output, binary or other machine-readable signal, etc. The manager 106 provides this output to the application program 120 that initiated the search operation 600. After step 610, step 616 asks whether the search is done. For example, if the sequence 600 is implemented to search for a single word match, then the answer to step 612 is "yes", and the routine is finished as shown by 618. Similarly, if the interval-by-interval progression (606, 608, 614) has reached the end of the table 118, the answer to step 616 is "yes."

On the other hand, in the optional embodiment where the sequence 600 is being used to search for all words in the table that match the search word (or to perform a search limited to a number of matching words, or a search time, or other parameter not limited to one search match), and the end of table 118 has not been reached, then step 616 continues proceeds to step 617, which advances to the next row in the table. After this, the routine 600 goes to step 604, which occurs as discussed above.

Accordingly, the routine 600 proceeds as described above until, ultimately, the exact search word is (618) or is not (612) found in the table, or some but not all required partial matches to the search word are found (612), or all required partial matches of the search word are found (618). Expanding upon the sequence 600, APPENDIX B shows a more detailed listing of how a search (according to 600) of the compressed data streams of APPENDIX A would be conducted for the search word "churches."

Other Embodiments

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 USC □112, sixth paragraph, unless the element is expressly recited using the phrase "means for" or, in the case of a method claim, the phrase "step for."

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

APPENDIX A

```
***** HEADER *****
Position count = 8
Order    =  1 2 6 7 4 0 5 3
Length end =  0 0 0 0 0 16 8 13
Symbol decode count = 24
Symbol decode table = S g b l i e a o v <0> s <16FE>
<16FF> <16FD> c W t h u m r y n '
One byte codes     = 20  9  16  9  9 23  0 15  6  6  6  2 14
14 14
One byte lengths   =  2  3  2  1  7  2  1  2  1  2  3  1  2
4  5
Interval offsets   = 685 710 718 741 772 790 821 842 859
***** INTERVAL STREAM (0 @ 685) *****
Address    685:  FF-0B-00-05-00-09      JUMP            5 relative
positions,      9 relative bytes
Address    691:  0C                     ONE-BYTE   code 14, char
c, length     2,   [0-1]
Address    692:  07                     ONE-BYTE   code 15, char
W, length     2,   [2-3]
Address    693:  06                     ONE-BYTE   code  0, char
S, length     1,   [4-4]
Address    694:  FF-0B-00-0B-00-0D      JUMP           11 relative
positions,     13 relative bytes
Address    700:  FF-10-06               INTERVAL   code 16, char
t, length     6,   [5-10]
Address    703:  0D                     ONE-BYTE   code 14, char
c, length     4,   [11-14]
Address    704:  FF-01-01               INTERVAL   code  1, char
g, length     1,   [15-15]
Address    707:  0B                     ONE-BYTE   code  2, char
b, length     1,   [16-16]
Address    708:  FF-0D                  END
***** INTERVAL STREAM (1 @ 710) *****
Address    710:  FF-11-0D               INTERVAL   code 17, char
h, length    13,   [0-12]
Address    713:  FF-03-04               INTERVAL   code  3, char
l, length     4,   [13-16]
Address    716:  FF-0D                  END
***** INTERVAL STREAM (2 @ 718) *****
Address    718:  FF-0B-00-0F-00-0F      JUMP           15 relative
positions,     15 relative bytes
Address    724:  FF-04-04               INTERVAL   code  4, char
i, length     4,   [0-3]
Address    727:  FF-05-08               INTERVAL   code  5, char
e, length     8,   [4-11]
Address    730:  FF-12-03               INTERVAL   code 18, char
u, length     3,   [12-14]
Address    733:  FF-04-01               INTERVAL   code  4, char
i, length     1,   [15-15]
Address    736:  FF-05-01               INTERVAL   code  5, char
e, length     1,   [16-16]
Address    739:  FF-0D                  END
***** INTERVAL STREAM (3 @ 741) *****
Address    741:  FF-0B-00-06-00-0B      JUMP            6 relative
positions,     11 relative bytes
Address    747:  FF-13-02               INTERVAL   code 19, char
m, length     2,   [0-1]
Address    750:  02                     ONE-BYTE   code 16, char
t, length     2,   [2-3]
Address    751:  00                     ONE-BYTE   code 20, char
r, length     2,   [4-5]
Address    752:  FF-0B-00-05-00-0D      JUMP            5 relative
positions,     13 relative bytes
Address    758:  FF-15-02               INTERVAL   code 21, char
y, length     2,   [6-7]
Address    761:  09                     ONE-BYTE   code  6, char
a, length     2,   [8-9]
Address    762:  FF-07-01               INTERVAL   code  7, char
o, length     1,   [10-10]
Address    765:  00                     ONE-BYTE   code 20, char
r, length     2,   [11-12]
Address    766:  FF-10-03               INTERVAL   code 16, char
t, length     3,   [13-15]
Address    769:  08                     ONE-BYTE   code  6, char
a, length     1,   [16-16]
Address    770:  FF-0D                  END
***** INTERVAL STREAM (4 @ 772) *****
Address    772:  FF-0B-00-08-00-0D      JUMP            8 relative
positions,     13 relative bytes
Address    778:  FF-16-03               INTERVAL   code 22, char
n, length     3,   [0-2]
Address    781:  FF-13-03               INTERVAL   code 19, char
m, length     3,   [3-5]
Address    784:  05                     ONE-BYTE   code 23, char
', length     2,   [6-7]
Address    785:  02                     ONE-BYTE   code 16, char
t, length     2,   [8-9]
Address    786:  00                     ONE-BYTE   code 20, char
r, length     2,   [10-11]
Address    787:  0E                     ONE-BYTE   code 14, char
c, length     5,   [12-16]
Address    788:  FF-0D                  END
***** INTERVAL STREAM (5 @ 790) *****
Address    790:  FF-0B-00-07-00-0D      JUMP            7 relative
positions,     13 relative bytes
Address    796:  FF-05-03               INTERVAL   code  5, char
e, length     3,   [0-2]
Address    799:  0A                     ONE-BYTE   code  6, char
a, length     3,   [3-5]
Address    800:  FF-03-01               INTERVAL   code  3, char
l, length     1,   [6-6]
Address    803:  FF-0B-00-05-00-0D      JUMP            5 relative
positions,     13 relative bytes
Address    809:  FF-08-01               INTERVAL   code  8, char
v, length     1,   [7-7]
Address    812:  00                     ONE-BYTE   code 20, char
r, length     2,   [8-9]
Address    813:  FF-04-02               INTERVAL   code  4, char
i, length     2,   [10-11]
Address    816:  FF-11-05               INTERVAL   code 17, char
h, length     5,   [12-16]
Address    819:  FF-0D                  END
***** INTERVAL STREAM (6 @ 821) *****
Address    821:  FF-0B-00-07-00-0F      JUMP            7 relative
positions,     15 relative bytes
Address    827:  FF-15-03               INTERVAL   code 21, char
y, length     3,   [0-2]
Address    830:  FF-16-02               INTERVAL   code 22, char
n, length     2,   [3-4]
Address    833:  FF-03-02               INTERVAL   code  3, char
l, length     2,   [5-6]
Address    836:  FF-05-07               INTERVAL   code  5, char
e, length     7,   [7-13]
Address    839:  01                     ONE-BYTE   code  9, char
, length     3,   [14-16]
Address    840:  FF-0D                  END
***** INTERVAL STREAM (7 @ 842) *****
Address    842:  FF-0B-00-09-00-0B      JUMP            9 relative
positions,     11 relative bytes
Address    848:  03                     ONE-BYTE   code  9, char
, length     1,   [0-0]
Address    849:  FF-0A-01               INTERVAL   code 10, char
s, length     1,   [1-1]
Address    852:  04                     ONE-BYTE   code  9, char
, length     7,   [2-8]
Address    853:  FF-0A-05               INTERVAL   code 10, char
s, length     5,   [9-13]
Address    856:  01                     ONE-BYTE   code  9, char
, length     3,   [14-16]
Address    857:  FF-0D                  END
```

APPENDIX B

```
Start compare expression, index  =  0,  length  =  8
Activate search symbol,   pos   7, 7,     code  d
Activate search symbol,   pos   7, p,     code  d
Activate search symbol,   pos   7, P,     code  d
Activate search symbol,   pos   7, q,     code  d
Activate search symbol,   pos   7, Q,     code  d
Activate search symbol,   pos   7, r,     code 14
Activate search symbol,   pos   7, R,     code  d
Activate search symbol,   pos   7, s,     code  a
Activate search symbol,   pos   7, S,     code  0
Activate search symbol,   pos   6, 3,     code  d
Activate search symbol,   pos   6, d,     code  d
Activate search symbol,   pos   6, D,     code  d
Activate search symbol,   pos   6, e,     code  5
Activate search symbol,   pos   6, E,     code  d
Activate search symbol,   pos   6, f,     code  d
Activate search symbol,   pos   6, F,     code  d
Activate search symbol,   pos   5, 4,     code  d
Activate search symbol,   pos   5, g,     code  1
Activate search symbol,   pos   5, G,     code  d
Activate search symbol,   pos   5, h,     code 11
Activate search symbol,   pos   5, H,     code  d
Activate search symbol,   pos   5, i,     code  4
Activate search symbol,   pos   5, I,     code  d
Activate search symbol,   pos   4, 2,     code  d
Activate search symbol,   pos   4, a,     code  6
Activate search symbol,   pos   4, A,     code  d
Activate search symbol,   pos   4, b,     code  2
Activate search symbol,   pos   4, B,     code  d
Activate search symbol,   pos   4, c,     code  e
Activate search symbol,   pos   4, C,     code  d
Activate search symbol,   pos   3, p,     code  d
Activate search symbol,   pos   3, P,     code  d
Activate search symbol,   pos   3, q,     code  d
Activate search symbol,   pos   3, Q,     code  d
Activate search symbol,   pos   3, r,     code 14
Activate search symbol,   pos   3, R,     code  d
Activate search symbol,   pos   3, s,     code  a
Activate search symbol,   pos   3, S,     code  0
Activate search symbol,   pos   2, 8,     code  d
Activate search symbol,   pos   2, t,     code 10
Activate search symbol,   pos   2, T,     code  d
Activate search symbol,   pos   2, u,     code 12
Activate search symbol,   pos   2, U,     code  d
Activate search symbol,   pos   2, v,     code  8
Activate search symbol,   pos   2, V,     code  d
Activate search symbol,   pos   1, 4,     code  d
Activate search symbol,   pos   1, 4,     code  d
Activate search symbol,   pos   1, g,     code  1
Activate search symbol,   pos   1, G,     code  d
Activate search symbol,   pos   1, h,     code 11
Activate search symbol,   pos   1, H,     code  d
Activate search symbol,   pos   1, i,     code  4
Activate search symbol,   pos   1, I,     code  d
Activate search symbol,   pos   0, 2,     code  d
Activate search symbol,   pos   0, a,     code  6
Activate search symbol,   pos   0, A,     code  d
Activate search symbol,   pos   0, b,     code  2
Activate search symbol,   pos   0, B,     code  d
Activate search symbol,   pos   0, c,     code  e
Activate search symbol,   pos   0, C,     code  d
Start database search
Get next interval, symbol pos   0, target item      0
Found JUMP
Found ONEBYTE
Target word [0] = c
Get next interval, symbol pos   1, target item      0
Found INTERVAL
Target word [1] = h
Get next interval, symbol pos   2, target item      0
Found JUMP
Found INTERVAL
Target word [2] = i
Get next interval, symbol pos   3, target item      0
Found JUMP
Found INTERVAL
Target word [3] = m
Get next interval, symbol pos   4, target item      0
Found JUMP
Found INTERVAL
```

APPENDIX B-continued

```
Target word [4] = n
Get next interval, symbol pos   5, target item      0
Found JUMP
Found INTERVAL
Target word [5] = e
Get next interval, symbol pos   6, target item      0
Found JUMP
Found INTERVAL
Target word [6] = y
Get next interval, symbol pos   7, target item      0
Found JUMP
Found ONEBYTE
Target word [7] =
Move to item, target item       0
Get next interval, symbol pos   2, target item      4
Found INTERVAL
Target word [2] = e
Get next interval, symbol pos   2, target item     12
Found INTERVAL
Target word [2] = u
Get next interval, symbol pos   6, target item     12
Performing JUMP
Found INTERVAL
Target word [6] = e
Get next interval, symbol pos   7, target item     12
Performing JUMP
Found INTERVAL
Target word [7] = s
Get next interval, symbol pos   4, target item     12
Performing JUMP
Found ONEBYTE
Found ONEBYTE
Found ONEBYTE
Target word [4] = c
Get next interval, symbol pos   0, target item     12
Performing JUMP
Found JUMP
Found INTERVAL
Found ONEBYTE
Target word [0] = c
Get next interval, symbol pos   5, target item     12
Performing JUMP
Found JUMP
Performing JUMP
Found INTERVAL
Target word [5] = h
Get next interval, symbol pos   3, target item     12
Performing JUMP
Found JUMP
Performing JUMP
Found ONEBYTE
Target word [3] = r
Word found: churches
Move to item, target item      13
Get next interval, symbol pos   1, target item     13
Found INTERVAL
Target word [1] = l
Get next interval, symbol pos   1, target item     17
Found END
```

The invention claimed is:

1. A computer-implemented method for searching a collection of machine readable digital data, the method comprising:

a computer receiving a given search word;

the computer evaluating the search word against some or all words in a table, said table having rows and columns, each word residing in a different row and each letter of the word occupying a different column in that row, where the words are stored so as to preserve order of the letters within the words, and where each contiguous run of same letters in a column forms an interval, and such that the lengths of the intervals are maximized to facilitate data searching, the evaluating operation comprising:

for each target word in the table to which the search word is being evaluated, comparing, one letter at a time, letters of the search word to corresponding letters of the target word as represented by the columns in the table;

upon completing the evaluating operation without finding a successful match, providing an output representing a failed match.

2. The method of claim 1, where:

the comparing operation comprises the operations of:

establishing a pointer for each letter of the search word, each pointer identifying a corresponding column in a first row of the table;

comparing letters of the search word to letters at the corresponding pointers; and providing a skipping operation that comprises advancing each pointer to a row in the table where a next interval begins in a column where the comparing operation encountered the letter of the search word failing to match the letter of the target word.

3. The method of claim 2, the operations further comprising computing how many intervals are present in each column, and determining a low-to-high order of the columns as to intervals present therein; where the operation of comparing letters of the search word to a letter at the corresponding pointer progresses from pointer to pointer in accordance with the low-to-high order.

4. The method of claim 2, where the table resides in a compressed form including a data stream comprising, for each column, run length coding of the intervals in that column;

the table further including metadata, said metadata including jump codes, each jump code having a given position in the data stream and identifying a second position in the data stream constituting a relative jump from the given position spanning a predetermined number of table rows;

where the skipping operation comprises:

for each pointer, utilizing the jump codes to advance the pointer a known number of table rows ahead, and thereafter moving any additionally required number of additional intervals to reach a position corresponding to a word in the table where said next interval begins.

5. The method of claim 1, where:

the table further includes metadata identifying rows below which no occurrences of words of various letter lengths occur in the table;

the operations comprise concluding the comparing operation at a row below which there are no remaining occurrences of words with same length in letters as the search word.

6. An article of manufacture, comprising:

a computer readable storage medium tangibly embodying one or more of the following:

(1) a first program of machine-readable instructions executable by a digital processing apparatus to perform operations of searching a collection of machine-readable digital data, (2) a second program of machine-readable instructions executable by a digital processing apparatus to perform installation of the first program;

where said operations comprise:

receiving a given search word;

evaluating the search word against some or all words in a table, said table having rows and columns, each word residing in a different row and each letter of the word occupying a different column in that row, where the words are stored so as to preserve order of the letters within the words, and where each contiguous run of same letters in a column forms an interval, and such that lengths of the intervals are maximized to facilitate data searching, the evaluating operation comprising:

for each target word in the table to which the search word is being evaluated, comparing, one letter at a time, letters of the search word to corresponding letters of the target word as represented by the columns in the table;

upon completing the evaluating operation without finding a successful match, providing an output representing a failed match.

7. An apparatus, comprising:

circuitry of multiple interconnected electrically conductive elements configured to perform operations of searching a collection of machine-readable digital data;

where said operations comprise:

receiving a given search word;

evaluating the search word against some or all words in a table, said table having rows and columns, each word residing in a different row and each letter of the word occupying a different column in that row, where the words are stored so as to preserve order of the letters within the words, and where each contiguous run of same letters in a column forms an interval, and such that lengths of the intervals are maximized to facilitate data searching, the evaluating operation comprising:

for each target word in the table to which the search word is being evaluated, comparing, one letter at a time, letters of the search word to corresponding letters of the target word as represented by the columns in the table;

upon completing the evaluating operation without finding a successful match, providing an output representing a failed match.

8. A data processing computer apparatus, comprising:

at least one storage element configured to store a collection of machine-readable digital data including a plurality of words residing in a table having rows and columns, each word residing in a different row and each letter of the word occupying a different column in that row, where the words are stored so as to preserve order of the letters within the words, and where each contiguous run of same letters in a column forms an interval, and such that lengths of the intervals are maximized to facilitate data searching;

at least one processor configured to execute programmed instructions from a manager, the manager programmed to search the table by performing operations comprising:

receiving a given search word;

evaluating the search word against some or all words in the table, comprising operations of:

for each target word in the table to which the search word is being evaluated, comparing, one letter at a time, letters of the search word to corresponding letters of the target word as represented by the columns in the table;

upon completing the evaluating operation without finding a successful match, providing an output representing a failed match.

* * * * *